United States Patent
Talwar et al.

(10) Patent No.: US 8,560,313 B2
(45) Date of Patent: Oct. 15, 2013

(54) TRANSIENT NOISE REJECTION FOR SPEECH RECOGNITION

(75) Inventors: Gaurav Talwar, Farmington Hills, MI (US); Rathinavelu Chengalvarayan, Naperville, IL (US)

(73) Assignee: General Motors LLC, Detroit, MI (US)

( * ) Notice: Subject to any disclaimer, the term of this patent is extended or adjusted under 35 U.S.C. 154(b) by 699 days.

(21) Appl. No.: 12/779,653

(22) Filed: May 13, 2010

(65) Prior Publication Data
US 2011/0282663 A1    Nov. 17, 2011

(51) Int. Cl.
*G10L 15/20*    (2006.01)

(52) U.S. Cl.
USPC ............ 704/233; 704/217; 704/208; 704/214

(58) Field of Classification Search
USPC ......... 704/233, 222, 226, 200, 205, 206–210, 704/214–218; 381/94.1
See application file for complete search history.

(56) References Cited

U.S. PATENT DOCUMENTS

| | | | |
|---|---|---|---|
| 6,256,607 B1* | 7/2001 | Digalakis et al. | 704/222 |
| 7,475,012 B2* | 1/2009 | Garner et al. | 704/233 |
| 8,175,869 B2* | 5/2012 | Sung et al. | 704/218 |
| 8,213,635 B2* | 7/2012 | Li et al. | 381/94.1 |
| 2002/0116186 A1* | 8/2002 | Strauss et al. | 704/233 |

* cited by examiner

*Primary Examiner* — Huyen X. Vo
(74) *Attorney, Agent, or Firm* — Anthony Luke Simon; Reising Ethington P.C.

(57) ABSTRACT

A method of and system for transient noise rejection for improved speech recognition. The method comprises the steps of (a) receiving audio including user speech and at least some transient noise associated with the speech, (b) converting the received audio into digital data, (c) segmenting the digital data into acoustic frames, and (d) extracting acoustic feature vectors from the acoustic frames. The method also comprises the steps of (e) evaluating the acoustic frames for transient noise on a frame-by-frame basis, (f) rejecting those acoustic frames having transient noise, (g) accepting as speech frames those acoustic frames having no transient noise and, thereafter, (h) recognizing the user speech using the speech frames.

17 Claims, 3 Drawing Sheets

TRANSIENT NOISE REJECTION FOR SPEECH RECOGNITION

TECHNICAL FIELD

The present invention relates generally to speech signal processing and, more particularly, to automatic speech recognition (ASR).

BACKGROUND OF THE INVENTION

ASR technologies enable microphone-equipped computing devices to interpret speech and thereby provide an alternative to conventional human-to-computer input devices such as keyboards or keypads. A typical ASR system includes several basic elements. A microphone and an acoustic interface receive an utterance of a word from a user, and digitize the utterance into acoustic data. An acoustic pre-processor parses the acoustic data into information-bearing acoustic features. A decoder uses acoustic models to decode the acoustic features into utterance hypotheses. The decoder generates a confidence value for each hypothesis to reflect the degree to which each hypothesis phonetically matches a subword of each utterance, and to select a best hypothesis for each subword. Using language models, the decoder concatenates the subwords into an output word corresponding to the user-uttered word.

One problem encountered with ASR is that input audio contains not only speech utterances of a user, but also contains undesirable noise. Such noise can include ambient noise like continuous vehicle road noise, and transient noise like that from windshield wiper operation or non-speech vocalizations like coughing. Receipt of such transient noise by an ASR system may lead to ASR rejection errors where speech cannot be recognized, or errors of insertion or substitution of acoustic data that leads to misrecognition of speech. This problem is even more prevalent with speakers of tonal languages, like Mandarin, where digits are uttered as single syllables. For instance, when driving at highway speeds with windows open, wind buffeting at a vehicle microphone causes transient noise so severe that Mandarin digit dialing is nearly impossible.

SUMMARY OF THE INVENTION

According to one aspect of the invention, there is provided a method of speech recognition. The method comprises the steps of (a) receiving audio including user speech and at least some transient noise associated with the speech, (b) converting the received audio into digital data, (c) segmenting the digital data into acoustic frames, and (d) extracting acoustic feature vectors from the acoustic frames. The method also comprises the steps of (e) evaluating the acoustic frames for transient noise on a frame-by-frame basis, (f) rejecting those acoustic frames having transient noise, (g) accepting as speech frames those acoustic frames having no transient noise and, thereafter, (h) recognizing the user speech using the speech frames.

According to another aspect of the invention, a computer program product includes instructions on a computer readable medium and executable by a computer processor of a speech recognition system to cause the system to implement the aforementioned method steps.

According to an additional aspect of the invention, there is provided a speech recognition system comprising an acoustic interface to receive audio including user speech and at least some noise associated with the signal, and a pre-processor to pre-process the received audio. The pre-processor segments the digital data into acoustic frames, extracts acoustic feature vectors from the acoustic frames, evaluates the acoustic frames for transient noise on a frame-by-frame basis, rejects those acoustic frames having transient noise, and accepts as speech frames those acoustic frames having no transient noise. The system also comprises a decoder to recognize the user speech using the speech frames.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The following description describes an example communications system, an example ASR system that can be used with the communications system, and one or more example methods that can be used with one or both of the aforementioned systems. The methods described below can be used by a vehicle telematics unit (VTU) as a part of recognizing speech uttered by a user of the VTU. Although the methods described below are such as they might be implemented for a VTU, it will be appreciated that they could be useful in any type of vehicle speech recognition system and other types of speech recognition systems.

Communications System—

Figure 1:
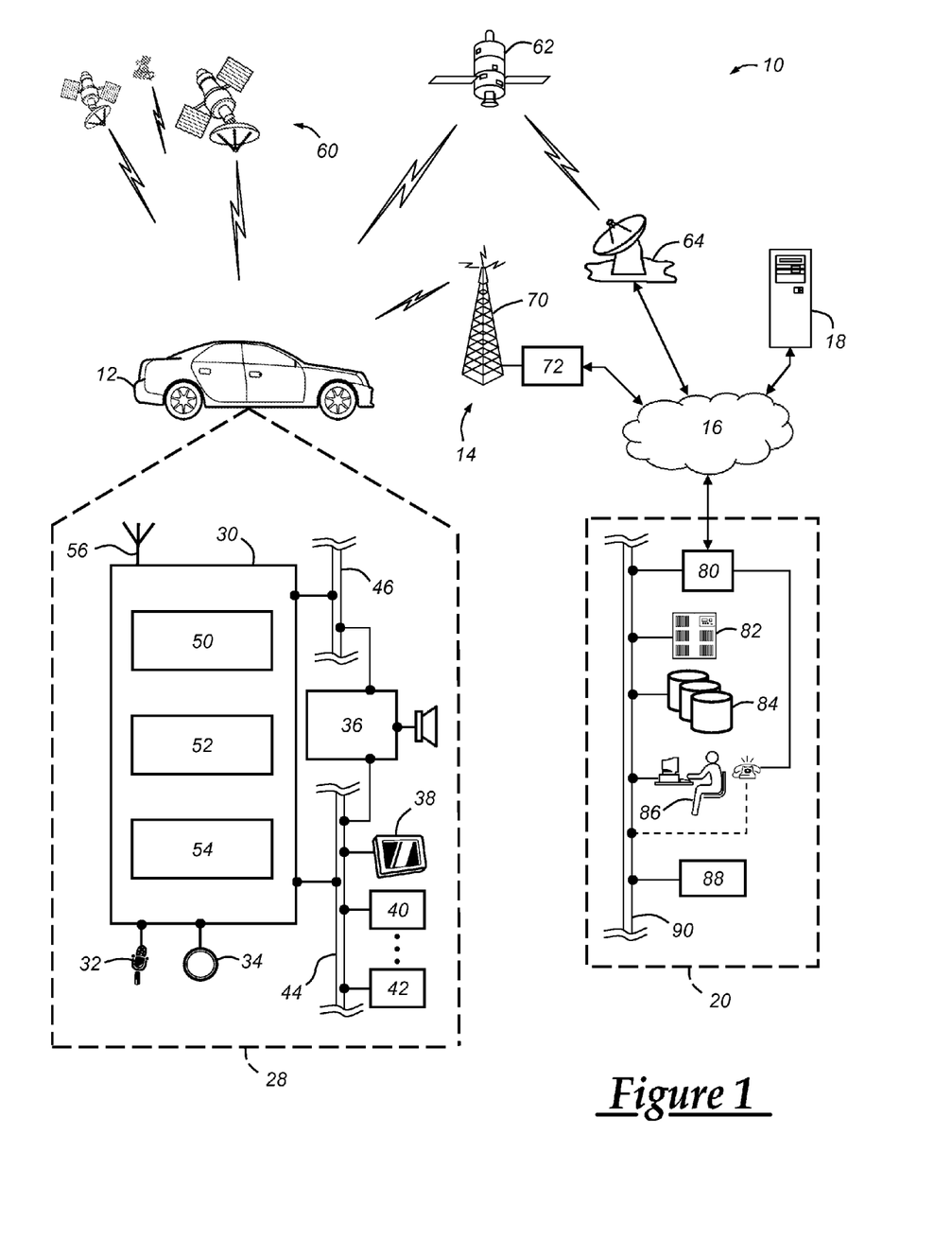
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automatic voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automatic voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automatic voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automatic advisor or, a combination of VRS 88 and the live advisor 86 can be used.

Automatic Speech Recognition System—

Figure 2:
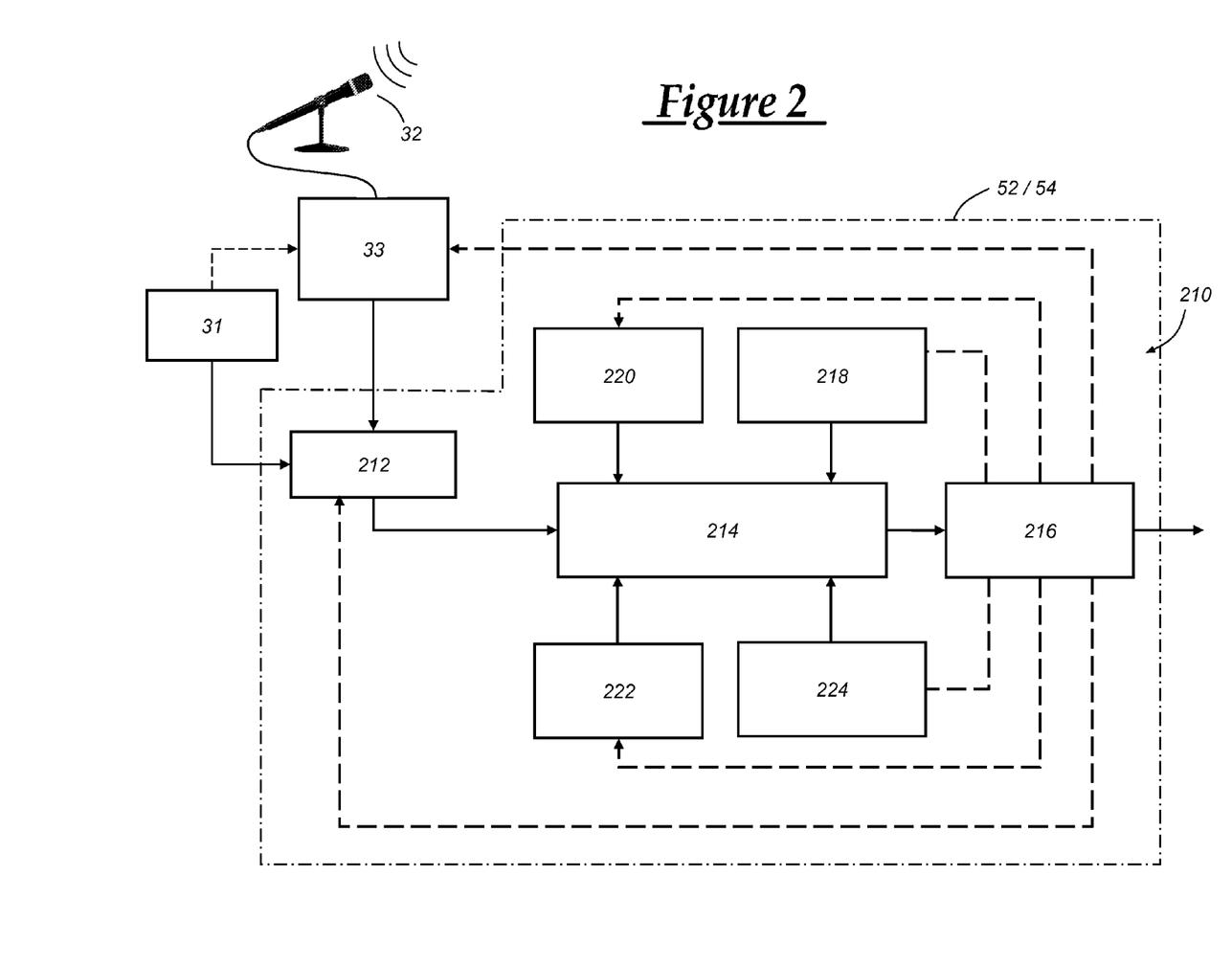
FIG. 2 is a block diagram illustrating an exemplary embodiment of an automatic speech recognition (ASR) system that can be used with the system of FIG. 1 and used to implement exemplary methods of speech recognition.

Turning now to FIG. 2, there is shown an exemplary architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific exemplary ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the telematics processor 52 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

The system 210 can also receive speech from any other suitable audio source(s) 31, which can be directly communicated with the pre-processor software module 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module 212 transforms the continuous stream of digital speech data into discrete sequences of acoustic parameters. More specifically, the processor 52 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module 216 receives the output data from the decoder module 214 for any suitable purpose. In one example, the post-processor software module 216 can identify or select one of the reference patterns from the N-best list of single or multiple word reference patterns as recognized speech. In another example, the post-processor module 216 can be used to convert acoustic data into text or digits for use with other aspects of the ASR system or other vehicle systems. In a further example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Method—

Figure 3:
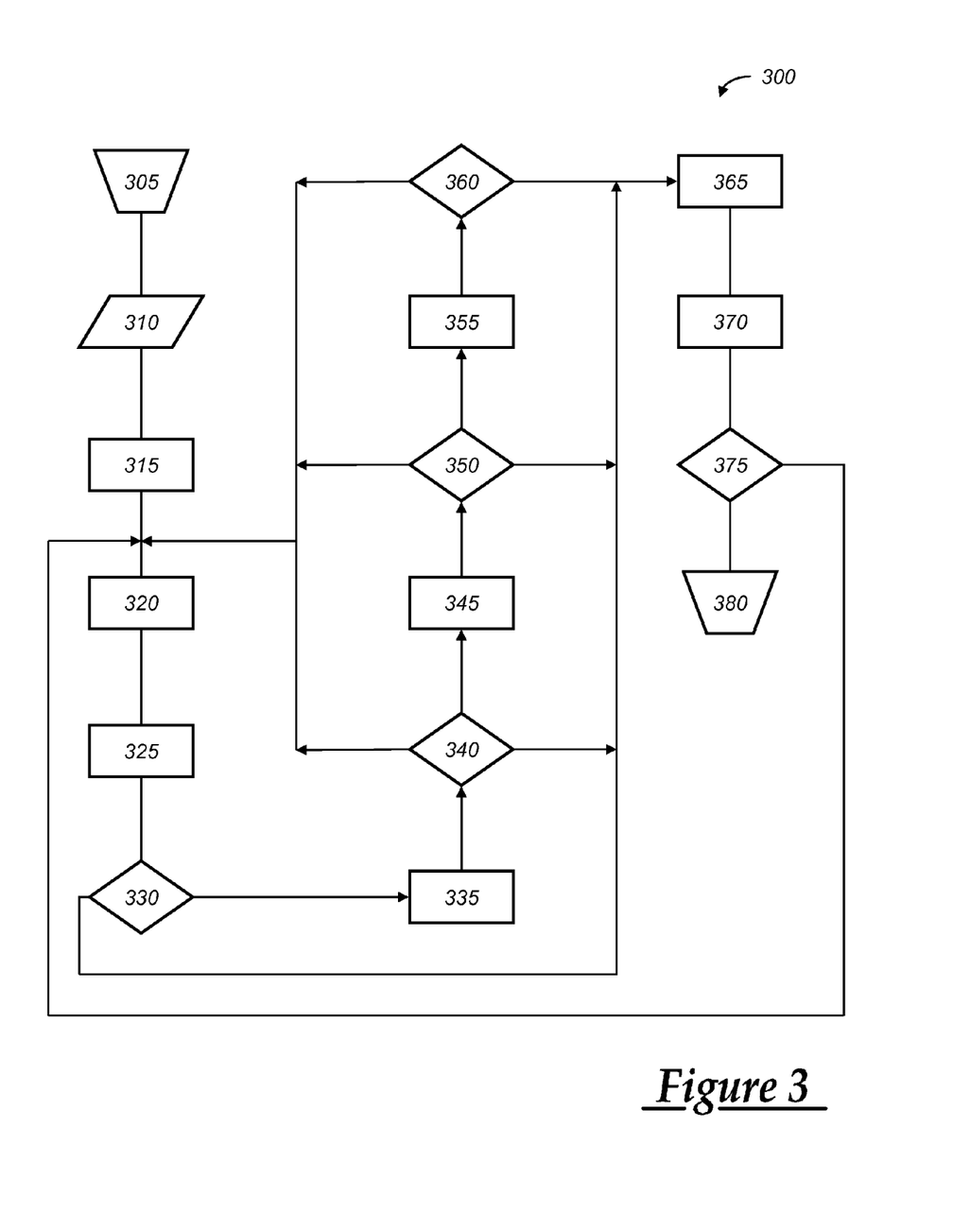
FIG. 3 is a flow chart illustrating an exemplary embodiment of a method of transient noise rejection for speech recognition that can be carried out by the ASR system of FIG. 2.

Turning now to FIG. 3, there is shown a transient noise rejection method 300 that can be carried out using suitable programming of the ASR system 210 of FIG. 2 within the operating environment of the vehicle telematics unit 30 as well as using suitable hardware and programming of the other components shown in FIG. 1. These features of any particular implementation will be known to those skilled in the art based on the above system description and the discussion of the method described below in conjunction with the remaining figures. Those skilled in the art will also recognize that the method can be carried out using other ASR systems within other operating environments. The method steps may or may not be sequentially processed in the example described below, and the invention encompasses any sequencing, overlap, parallel processing, or reordering of such steps.

In general, the method 300 is provided to improve speech recognition performance by rejecting transient noise on an acoustic frame-by-frame basis before acoustic frames are decoded. Audio including speech and noise is received and then pre-processed to segment the digital data into acoustic frames, and extract acoustic feature vectors from the acoustic frames. The audio is further pre-processed to evaluate the acoustic frames for transient noise on a frame-by-frame basis, reject those acoustic frames having transient noise, and accept as speech frames those acoustic frames having no transient noise. Thereafter, acoustic feature vectors of the speech frames are decoded.

Referring again to FIG. 3, the method 300 begins in any suitable manner at step 305. For example, a vehicle user starts interaction with the user interface of the telematics unit 30, preferably by depressing the user interface pushbutton 34 to begin a session in which the user inputs voice commands that are interpreted by the telematics unit 30 while operating in speech recognition mode. Using the audio system 36, the telematics unit 30 can acknowledge the pushbutton activation by playing a sound or providing a verbal request for a command from the user or occupant.

At step 310, audio is received in any suitable manner. For example, the received audio may include input speech from a user and at least some transient noise associated with the speech. More specifically, the audio can be received by the microphone 32, acoustic interface 33, and processor 52 and/or memory 54 of the ASR system 210. The speech may include vocabulary desired to be recognized, and the noise may include undesirable transient noise. For example, transient noise may include noise from windshield wiper operation, turn signal clicking, vehicle tires traversing rumble strips or lane dividers on a road, non-target speech from non-target vehicle passengers, non-speech vocalizations like coughing or vocalization from pets, and/or the like. As used herein, the terminology transient noise can include any and all types of transient noise. In one embodiment, the transient noise is associated with the signal, for example, when it occurs simultaneously with speech being received, or just before or just after such speech, when receiving audio during a speech recognition session.

At step 315, received audio is converted into digital data form. For example, the acoustic interface 33 of the telematics unit 30 can be used to digitize the analog audio into acoustic digital data.

At step 320, received audio is pre-processed to segment digital data into acoustic frames, and extract acoustic feature vectors from the acoustic frames. For example, the pre-processor 212 segments the audio data into frames of, for instance, 10-20 ms in length each having, for example, 160-320 acoustic samples. The pre-processor 212 can extract vectors for any suitable type of features including Mel-frequency cepstrum coefficients (MFCC's), linear predictive coding coefficients (LPCC's), perceptual linear prediction coefficients (PLPC's), relative spectral transform—perceptual linear prediction features (RASTA-PLP features), and/or any other suitable acoustic features. And any particular acoustic feature type can be represented by any suitable quantity of the particular acoustic feature. For example, an acoustic feature vector having thirty-nine features may include thirteen MFCC's, thirteen LPCC's, and thirteen PLPC's. Any subset of the total available type and/or quantity of acoustic features can be evaluated to improve speech recognition. The time-varying feature vectors can be extracted on a frame-by-frame basis, from within each frame.

Steps 325-365 represent examples of the method 300, wherein the received audio is further pre-processed to evaluate the acoustic frames for transient noise on a frame-by-frame basis, reject those acoustic frames having transient noise, and accept as speech frames those acoustic frames having no transient noise. In hardware, the pre-processor 212 of the ASR system 210 can be modified to classify undesirable transient noise from desirable speech, and reject the transient noise but accept the speech for communication to the decoder 214. More specifically, the pre-processor can be modified to evaluate acoustic frames on a frame-by-frame basis and skip or reject those acoustic frames determined to have transient noise so that those acoustic frames are not accepted or passed along to the decoder 214. Such pre-processing improves audio quality during a speech recognition session, thereby leading to improved speech recognition speed and accuracy at the decoder 214.

At step 325, an acoustic frame is analyzed to determine whether the acoustic frame includes a voiced signal or an unvoiced signal. Transient noise sounds lack a certain periodicity and pitch that speech sounds inherently possess because of the presence of a fundamental harmonic therein. In an example embodiment, glottal pulses of speech are related to such periodicity and pitch and can be readily identified in short segments of acoustic frames. The segmented frames from step 320 are relatively short and, thus, can be determined to be voiced if one or more glottal pulses are identified in a particular acoustic frame. A glottal pulse can be identified in any suitable manner, for example, using spectrogram analysis, voiced/unvoiced decision functions, or in any other suitable manner.

At step 330, the acoustic frame is accepted for decoding if it is determined to include a voiced signal. For example, if a glottal pulse can be identified with a certain level of confidence, then the acoustic frame can be accepted. More specifically, an acceptable confidence threshold value can be set and if the glottal pulse determination meets or exceeds the threshold value, then the acoustic frame is determined to include a voiced signal. Confidence values and calculations are well known to those of ordinary skill in the art and can be calculated in any suitable manner, including using supervised learning techniques, neural networks, or the like. The particular threshold value can be empirically determined for any given application and, thus, can be any value appropriate for a given environment and circumstances. An example confidence threshold can be, for example, a 75% confidence level. If it is determined that the acoustic frame represents a voiced signal, for example, because a glottal pulse determination exceeds a threshold confidence level, then the method 300 proceeds to step 365, otherwise, the method 300 proceeds to step 335. According to the illustrated embodiment, the pair of steps 325, 330 can precede the other pairs of steps 335, 340 and 345, 350, and 355, 360. According to another embodiment, those other pairs of steps can be rearranged in any other order.

At step 335, at least two time spaced samples within the acoustic frame are assessed to determine autocorrelation of the samples within the frame. Unlike transient noise, especially transient white noise, speech samples tend to be highly correlated. In an example embodiment, autocorrelation can be computed for two samples in the acoustic frame spaced by a time lag T for different values of the time lag and can be represented simply as $R(x(t), x(t+T))$. The autocorrelation can be computed in any suitable manner and on any suitable quantity of samples within the frame. Autocorrelation calculations are well known to those of ordinary skill in the art and can be carried out with any suitable statistical software brands like MATLAB, MINITAB, SAS, or the like. In a variation of this step, a Fourier transform can be taken of the autocorrelation to establish spectral energy in the frame.

At step 340, the acoustic frame is rejected if it is determined that the autocorrelation is insufficient. For example, if the autocorrelation is determined to be less than an unacceptable threshold level, for example, 25%, then the acoustic frame can be rejected. In another example, where spectral energy in the acoustic frame is relatively flat then the acoustic frame can be rejected. In either case, if the autocorrelation is insufficient, the method 300 loops back to step 320 to obtain a subsequent acoustic frame. Conversely, if the autocorrelation is determined to be sufficient, then the acoustic frame can be accepted and the method can proceed to step 365. For example, the autocorrelation can be determined to be sufficient if it is greater than or equal to an acceptable threshold value, for example, 75%. Otherwise, the method 300 proceeds to step 345. The particular threshold values can be empirically determined for any given application and, thus, can be any values appropriate for a given environment and circumstances.

At step 345, the acoustic frame is compared to a preceding acoustic frame already accepted as speech, to determine cross-correlation between the acoustic frames. The preceding frame can be an acoustic frame that was successfully accepted as a speech frame, and that immediately preceded the present acoustic frame being analyzed or preceded the present acoustic frame with any suitable quantity of intervening acoustic frames therebetween. In other words, cross-correlation can be computed for samples in sequential frames as Rxy (Frame 1, Frame 2) or in non-sequential frames Rxy (Frame i, Frame n), and can be computed in any suitable manner and by comparing any suitable sample(s) within the present acoustic frame and any suitable sample(s) within the preceding acoustic frame. Cross-correlation calculations are well known to those of ordinary skill in the art and can be carried out with any suitable statistical software brands like MATLAB, MINITAB, SAS, or the like.

At step 350, the acoustic frame is rejected if it is determined that the cross-correlation is insufficient. For example, if the cross-correlation is determined to be less than an unacceptable level, for example, 25%, then the acoustic frame can be rejected. If the cross-correlation is insufficient, the method 300 loops back to step 320 to obtain a subsequent acoustic frame. Conversely, if the cross-correlation is determined to be sufficient, then the acoustic frame can be accepted and the method can proceed to step 365. For example, the cross-correlation can be determined to be sufficient if it is greater than or equal to an acceptable threshold value, for example, 75%. Otherwise, the method 300 proceeds to step 355. The particular threshold values can be empirically determined for any given application and, thus, can be any values appropriate for a given environment and circumstances.

At step 355, a codebook trained on speech samples is applied to the acoustic frame to determine a location of the acoustic frame in multidimensional feature space. The codebook can be trained on pure speech samples. For example, the codebook can include a collection of feature vectors created from multiple acoustic frames of known speech from a current speaker that serves as a reference for subsequent speech from that speaker. In one embodiment, the multidimensional feature space can be defined by formant frequencies of speech frames. For example, a first formant can be plotted along one axis and a second formant can be plotted along another axis, with speech frames clustered together in various clusters. During this step, the current acoustic frame is applied to the codebook for feature vector quantization.

At step 360, the acoustic frame is rejected if it is determined that the acoustic frame is not assigned to a speech cluster. For example, if the acoustic frame does not get assigned to a cluster of the codebook in step 355, then the acoustic frame is considered an outlier and is rejected. The determination can be carried out in any suitable manner. For example, statistical distances from the acoustic frame to each of the clusters in the codebook can be determined and the least distance can be further analyzed. For instance, if the least distance of the current acoustic frame being analyzed is less than the greatest distance of one of the constituent frames of the cluster to the centroid of that cluster, then the current acoustic frame can be determined to be assigned to that cluster. This is just one example, and the determination can be carried out by other means. If the acoustic frame is not assigned to a speech cluster, the method 300 loops back to step 320 to obtain a subsequent acoustic frame. Otherwise, the method 300 proceeds to step 365.

At step 365, the acoustic frame is accepted as a speech frame if the acoustic frame has not been rejected by one or more of steps 325-360.

At step 370, and after step 365, the acoustic feature vectors of the speech frame accepted in step 365 are processed with a speech recognition engine or decoder to obtain at least one hypothesis for speech in the speech frame. For example, the speech frame, by itself or with other preceding or subsequent speech frames, can be decoded by the decoder 214 of the ASR system 210 using the grammar 218 and using one or more acoustic models 220 to produce N-best hypotheses and associated parameter values, for instance, confidence values.

At step 375, it is determined whether or not another acoustic frame is to be analyzed. If so, the method can loop back to step 320, or can end at step 380 in any suitable manner.

In contrast to prior techniques for dealing with noise in speech recognition, the presently disclosed method of transient noise rejection is carried out by the ASR system upstream of a speech recognition decoder. It is believed that such pre-processing transient classification and rejection will result in better accuracy and consistency than is possible with current techniques. For example, the method can be used to identify and eliminate acoustic frames of kids talking or dogs barking in a back seat of a vehicle, before such acoustic frames are presented to an ASR decoder. In another example, ASR-enabled navigational sessions may inadvertently terminate whenever a user's cough (interpreted as the word "route") follows the command word "cancel." With the presently disclosed method, the sound of a cough can be identified and eliminated so that it does not get presented to the ASR decoder.

Also, the presently disclosed method can improve speech signal processing speed and/or efficiency. The quantity of frames to be decoded corresponds to computer processing burden, wherein more frames to be decoded uses more computer processing capacity and less frames to be decoded uses less. Here, because the quantity of acoustic frames can be reduced, the presently disclosed method can result in a decrease in computer processing burden and an increase in speech recognition speed.

The method or parts thereof can be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes;

and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the invention can be applied to other fields of speech signal processing, for instance, mobile telecommunications, voice over internet protocol applications, and the like. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of speech recognition, comprising the steps of:
    (a) receiving audio including user speech and at least some transient noise associated with the speech;
    (b) converting the received audio into digital data;
    (c) segmenting the digital data into acoustic frames;
    (d) extracting acoustic feature vectors from the acoustic frames;
    (e) evaluating the acoustic frames for transient noise on a frame-by-frame basis;
    (f) rejecting those acoustic frames having transient noise, wherein steps (e) and (f) include assessing at least two time spaced samples within an acoustic frame to determine autocorrelation of the samples within the frame, and rejecting the acoustic frame if the autocorrelation is determined to be insufficient;
    (g) accepting as speech frames those acoustic frames having no transient noise; and thereafter
    (h) recognizing the user speech using the speech frames.

2. The method of claim 1, wherein the steps (e) and (g) include analyzing an acoustic frame to determine whether an acoustic frame includes a voiced or an unvoiced signal, and accepting the acoustic frame if the acoustic frame is determined to include a voiced signal.

3. The method of claim 1, wherein the steps (e) and (f) include comparing an acoustic frame to a preceding acoustic frame accepted as a speech frame to determine cross-correlation between the acoustic frames, and rejecting the acoustic frame if the cross-correlation is determined to be insufficient.

4. The method of claim 1, wherein the steps (e) and (f) include applying a codebook trained on speech samples to an acoustic frame to determine a location of the acoustic frame in multidimensional feature space, and rejecting the acoustic frame if it is determined that the acoustic frame is not assigned to a speech cluster.

5. The method of claim 1, wherein the steps (e), (f), and (g) include:
    analyzing an acoustic frame to determine whether an acoustic frame includes a voiced or an unvoiced signal;
    accepting the acoustic frame if the acoustic frame is determined to include a voiced signal; otherwise,
    assessing at least two time spaced samples within the acoustic frame to determine autocorrelation of the samples within the frame; and
    rejecting the acoustic frame if the autocorrelation is determined to be insufficient.

6. The method of claim 1, wherein the steps (e), (f), and (g) include:
    analyzing an acoustic frame to determine whether an acoustic frame includes a voiced or an unvoiced signal;
    accepting the acoustic frame if the acoustic frame is determined to include a voiced signal; otherwise,
    assessing at least two time spaced samples within the acoustic frame to determine autocorrelation of the samples within the frame;
    rejecting the acoustic frame if the autocorrelation is determined to be insufficient; otherwise,
    comparing the acoustic frame to a preceding acoustic frame accepted as a speech frame to determine cross-correlation between the acoustic frames; and
    rejecting the acoustic frame if the cross-correlation is determined to be insufficient.

7. The method of claim 1, wherein the steps (e), (f), and (g) include:
    analyzing an acoustic frame to determine whether an acoustic frame includes a voiced or an unvoiced signal;
    accepting the acoustic frame if the acoustic frame is determined to include a voiced signal; otherwise,
    assessing at least two time spaced samples within the acoustic frame to determine autocorrelation of the samples within the frame;
    rejecting the acoustic frame if the autocorrelation is determined to be insufficient, and accepting the acoustic frame if the autocorrelation is determined to be sufficient; otherwise,
    comparing the acoustic frame to a preceding acoustic frame accepted as a speech frame to determine cross-correlation between the acoustic frames;
    rejecting the acoustic frame if the cross-correlation is determined to be insufficient, and accepting the acoustic frame if the cross-correlation is determined to be sufficient; otherwise,
    applying a codebook trained on speech samples to the acoustic frame to determine a location of the acoustic frame in multidimensional feature space; and
    rejecting the acoustic frame if it is determined that the acoustic frame is not assigned to a speech cluster.

8. The method of claim 1, wherein the steps (e), (f), and (g) include:
    analyzing an acoustic frame to determine whether an acoustic frame includes a voiced or an unvoiced signal;
    accepting the acoustic frame if the acoustic frame is determined to include a voiced signal; otherwise,
    comparing the acoustic frame to a preceding acoustic frame accepted as a speech frame to determine cross-correlation between the acoustic frames; and rejecting the acoustic frame if the cross-correlation is determined to be insufficient.

9. The method of claim 1, wherein the steps (e), (f), and (g) include:
analyzing an acoustic frame to determine whether an acoustic frame includes a voiced or an unvoiced signal;
accepting the acoustic frame if the acoustic frame is determined to include a voiced signal; otherwise,
applying a codebook trained on speech samples to the acoustic frame to determine a location of the acoustic frame in multidimensional feature space; and
rejecting the acoustic frame if it is determined that the acoustic frame is not assigned to a speech cluster.

10. The method of claim 1, wherein the steps (e) and (f) include:
assessing at least two time spaced samples within an acoustic frame to determine autocorrelation of the samples within the frame;
rejecting the acoustic frame if the autocorrelation is determined to be insufficient; otherwise,
comparing the acoustic frame to a preceding acoustic frame accepted as a speech frame to determine cross-correlation between the acoustic frames; and
rejecting the acoustic frame if the cross-correlation is determined to be insufficient.

11. The method of claim 1, wherein the steps (e) and (f) include:
assessing at least two time spaced samples within an acoustic frame to determine autocorrelation of the samples within the frame;
rejecting the acoustic frame if the autocorrelation is determined to be insufficient; otherwise,
applying a codebook trained on speech samples to the acoustic frame to determine a location of the acoustic frame in multidimensional feature space; and
rejecting the acoustic frame if it is determined that the acoustic frame is not assigned to a speech cluster.

12. A computer program product including instructions on a computer readable medium and executable by a computer processor of a speech recognition system to cause the system to implement steps comprising:
(a) receiving audio including user speech and at least some transient noise associated with the speech;
(b) converting the received audio into digital data;
(c) segmenting the digital data into acoustic frames;
(d) extracting acoustic feature vectors from the acoustic frames;
(e) evaluating the acoustic frames for transient noise on a frame-by-frame basis;
(f) rejecting those acoustic frames having transient noise;
(g) accepting as speech frames those acoustic frames having no transient noise, wherein the steps (e), (f), and (g) include:
analyzing an acoustic frame to determine whether an acoustic frame includes a voiced or an unvoiced signal;
accepting the acoustic frame if the acoustic frame is determined to include a voiced signal; otherwise,
assessing at least two time spaced samples within the acoustic frame to determine autocorrelation of the samples within the frame;
rejecting the acoustic frame if the autocorrelation is determined to be insufficient; otherwise,
comparing the acoustic frame to a preceding acoustic frame accepted as a speech frame to determine cross-correlation between the acoustic frames;
rejecting the acoustic frame if the cross-correlation is determined to be insufficient; otherwise,
applying a codebook trained on speech samples to the acoustic frame to determine a location of the acoustic frame in multidimensional feature space; and
rejecting the acoustic frame if it is determined that the acoustic frame is not assigned to a speech cluster; and thereafter
(h) recognizing the user speech using the speech frames.

13. A speech recognition system, comprising:
an acoustic interface to receive audio including user speech and at least some transient noise associated with the speech;
a pre-processor to pre-process the received audio, including segmenting the digital data into acoustic frames, extracting acoustic feature vectors from the acoustic frames, evaluating the acoustic frames for transient noise on a frame-by-frame basis, rejecting those acoustic frames having transient noise, and accepting as speech frames those acoustic frames having no transient noise, wherein the pre-processor rejects those acoustic frames having transient noise by assessing at least two time spaced samples within an acoustic frame to determine autocorrelation of the samples within the frame, and rejecting the acoustic frame if the autocorrelation is determined to be insufficient; and
a decoder to recognize the user speech using the speech frames.

14. The system of claim 13, wherein the pre-processor rejects those acoustic frames having transient noise by analyzing an acoustic frame to determine whether an acoustic frame includes a voiced or an unvoiced signal, and accepting the acoustic frame if the acoustic frame is determined to include a voiced signal.

15. The system of claim 13, wherein the pre-processor rejects those acoustic frames having transient noise by comparing an acoustic frame to a preceding acoustic frame accepted as a speech frame to determine cross-correlation between the acoustic frames, and rejecting the acoustic frame if the cross-correlation is determined to be insufficient.

16. The system of claim 13, wherein the pre-processor rejects those acoustic frames having transient noise by applying a codebook trained on speech samples to an acoustic frame to determine a location of the acoustic frame in multidimensional feature space, and rejecting the acoustic frame if it is determined that the acoustic frame is not assigned to a speech cluster.

17. The system of claim 13, wherein the pre-processor accepts or rejects those acoustic frames having transient noise by the following steps:
analyzing an acoustic frame to determine whether an acoustic frame includes a voiced or an unvoiced signal;
accepting the acoustic frame if the acoustic frame is determined to include a voiced signal; otherwise,
assessing at least two time spaced samples within the acoustic frame to determine autocorrelation of the samples within the frame;
rejecting the acoustic frame if the autocorrelation is determined to be insufficient, and accepting the acoustic frame if the autocorrelation is determined to be sufficient;
otherwise,
comparing the acoustic frame to a preceding acoustic frame accepted as a speech frame to determine cross-correlation between the acoustic frames;
rejecting the acoustic frame if the cross-correlation is determined to be insufficient, and accepting the acoustic frame if the cross-correlation is determined to be sufficient;

otherwise, applying a codebook trained on speech samples to the acoustic frame to determine a location of the acoustic frame in multidimensional feature space; and rejecting the acoustic frame if it is determined that the acoustic frame is not assigned to a speech cluster.

* * * * *